United States Patent [19]
Proksch et al.

[11] Patent Number: 5,950,977
[45] Date of Patent: Sep. 14, 1999

[54] SEAT SUSPENSION SYSTEM WITH DEFINED PATH OF MOTION

[76] Inventors: Frederick D. Proksch, 1606 Misty Meadow La., Garner, N.C. 27529-5040; Lyle E. York, 1016 Brookhill Rd., Peoria, Ill. 61615-9721

[21] Appl. No.: 09/052,635

[22] Filed: Mar. 31, 1998

[51] Int. Cl.⁶ ................................................. F16M 13/00
[52] U.S. Cl. .................... 248/421; 108/145; 247/344.17
[58] Field of Search .................................. 248/157, 370, 248/421, 588, 631, 398, 133; 108/145, 147; 297/344.17

[56] References Cited

U.S. PATENT DOCUMENTS

| | | | |
|---|---|---|---|
| 3,826,457 | 7/1974 | Longchamp | 248/399 |
| 3,853,296 | 12/1974 | Forsell | 248/399 |
| 3,874,626 | 4/1975 | Gross et al. | 248/399 |
| 3,917,209 | 11/1975 | Adams | 248/421 |
| 4,822,094 | 4/1989 | Oldfather et al. | 296/65.1 |
| 4,941,641 | 7/1990 | Granzow et al. | 248/588 |
| 5,004,206 | 4/1991 | Anderson | 248/631 |
| 5,251,864 | 10/1993 | Itou | 248/588 |
| 5,346,170 | 9/1994 | Schmidt et al. | 248/550 |
| 5,735,509 | 4/1998 | Gryp et al. | 248/631 |
| 5,771,816 | 6/1998 | Zaguroli, Jr. | 108/147 |
| 5,800,016 | 9/1998 | Allred | 297/344.17 |
| 5,833,198 | 11/1998 | Graetz | 248/370 |

*Primary Examiner*—Derek J. Berger
*Assistant Examiner*—Kimberly Wood
*Attorney, Agent, or Firm*—Diana L. Charlton

[57] ABSTRACT

In the operation of a construction machine, various forces are exerted on a seat which are dampened by a shock absorber. A seat suspension mechanism is provided between the seat and the shock absorber for coordinating the movement of the seat. The seat suspension system has first and second pairs of link arms arranged on opposite sides of the seat. The first and second pairs of link arms each have a controller and follower arm which are pivotally joined substantially at a midpoint therealong. A first end of the controller arms are fixedly mounted for pivotally movement to the front portion of the base with a second end fixedly mounted for pivotally movement to the rear portion of the seat to provide movement along an arcuate path in response to the plurality of forces exerted during operation of the machine. A first end of the follower arms are operatively associated with the front portion of the bottom surface of the seat with a second end operatively associated with the rear portion of the base to provide movement along a second predetermined path. The second predetermined path allows for corrective motion to compensate the arcuate path of the controller arms which provides a substantially constant distance between the seat and a foot-operated control pedal throughout the movement of the seat.

11 Claims, 5 Drawing Sheets

Fig_1_

Fig_2_

Fig_3_

Fig-4

Fig_5_

SEAT SUSPENSION SYSTEM WITH DEFINED PATH OF MOTION

TECHNICAL FIELD

This invention relates generally to a seat suspension system and more particularly to maintaining a substantially constant distance between an operator and a control pedal throughout a defined path of motion for improved operator comfort and efficacy.

BACKGROUND ART

Present seat suspension systems for various work machines or the like typically include suspension arrangements for springing and damping movements incurred when forces are exerted on the seat during operation of the work machine. Although the damping movements may improve operator comfort, these systems generally operate to move the seat in a vertical direction which may cause the distance between the operator and any foot-controlled pedals to change throughout the operation of the machine. The changing distance between the seat and the foot-controlled pedals force the operator to compensate by shifting positions within the seat or varying the pressure on the foot-controlled pedals.

A design disclosed in U.S. Pat. No. 3,853,296 issued to Carl Fredrik Johan Sigvard Forssell on Dec. 10, 1974 utilizes a vehicle seat suspension with a pair of links arranged on opposite sides of a vehicle seat bottom. The separate links of each pair intersect each other and are joined together at their point of intersection. One link in each pair of links is firmly connected to the corresponding link of the opposite pair and is pivotally joined at its ends to the seat bottom and to a supporting portion. The other link arm is pivotally joined to any one of its three points of attachment and is both pivotally and displaceably arranged at the other two points of attachment. The rear end of the former pivotally connected link has a portion which is angled upwardly and the rear pivot point of the link lies within this portion so that the front and rear pivot points are roughly on the same level in the normal height position of the seat. This seat suspension system is designed to absorb large forces in a horizontal direction without risk of breaking under buckling stresses and which does not move appreciably in a horizontal direction during spring movement. This is accomplished due to the use of a pivotably journalled link arm which is longer than the other link arm and arranged so that both its ends lie outside the ends of the other link arm when viewed sideways of the seat. Although this system utilizes a scissor-type suspension system, the damping of the forces on the seat are still corrected in substantially a vertical direction changing the distance between the seat and the operator's foot-controlled pedals due, in part to the positions of the pivot points and methods of attachment.

The present invention is directed to overcoming the problems as set forth above.

DISCLOSURE OF THE INVENTION

In one aspect of the present invention, a seat suspension system is adapted for supporting an operator within a compartment of a work machine. The compartment of the work machine has at least one control pedal mounted therein operated by a foot of the operator. The seat suspension system comprises a base, a seat, spring means and a seat suspension mechanism. The seat has an upper surface in which an operator is positioned and a bottom surface. The seat is movable toward and away from the base. The spring means is positioned between the base and the seat to provide biasing support therebetween. The seat suspension mechanism is operatively associated with the bottom surface of the seat and the base for automatically moving the seat along a predetermined path of motion when forces are exerted thereon to maintain a substantially constant distance between the seat and the foot-operated control pedal throughout the predetermined path of motion.

In another aspect of the present invention, a seat suspension system is adapted for supporting an operator within a compartment of a work machine. The compartment has at least one control pedal mounted therein operated by a foot of the operator. The seat suspension system comprises a base with front and rear portions. A seat is movable toward and away from the base and has a top surface and a bottom surface with front and rear portions. Spring means is positioned between the base and the seat to provide biasing support therebetween. A seat suspension mechanism includes first and second pairs of link arms arranged on opposite sides of the seat. Each of the first and second pairs has a controller arm and a follower arm which are pivotally joined at a portion therealong. A first end of the controller arms of the first and second pairs of link arms is fixedly mounted for pivotally movement to the front portion of the base and a second end is fixedly mounted for pivotally movement to the rear portion of the bottom surface of the seat and adapted for movement along a first predetermined arcuate path in response to a plurality of forces exerted thereon. A first end of the follower arms of the first and second pair of link arms is operatively associated with the front portion of the bottom surface of the seat and a second end is operatively associated with the rear portion of the base and adapted for movement along a second predetermined path responsive to the first arcuate predetermined path for substantially maintaining a constant distance between the seat and the foot-operated control pedal throughout the first and second predetermined paths of movement of the controller and follower arms while maintaining a horizontal attitude of the seat in relation to the base.

In yet another aspect of the present machine, a seat suspension system comprises a base having front and rear portions. A seat is movable toward and away from the base and has a top surface and a bottom surface with front and rear portions. Spring means is positioned between the base and the seat to provide biasing support therebetween. A seat suspension mechanism includes first and second pairs of link arms arranged on opposite sides of the seat. Each of the first and second pairs has a controller arm and a follower arm which are pivotally joined at substantially a midpoint. A first end of the controller arms of the first and second pairs of link arms is fixedly mounted for pivotally movement to the front portion of the base and a second end is fixedly mounted for pivotally movement to the rear portion of the bottom surface of the seat. A first end of the follower arms of the first and second pair of link arms is operatively associated with the front portion of the bottom surface of the seat and a second end is operatively associated with the rear portion of the base. The respective first and second end of the controller and follower arms are positioned a substantially equal distance from the midpoint along a horizontal plane defined by the bottom surface of the seat.

In yet another aspect of the present machine, a method of maintaining a substantially constant distance between a seat and a control pedal operated by a foot of an operator within a work machine is disclosed. The method comprises the steps of connecting a base with front and rear portion to the work machine. Then, connecting the base and the seat through a seat suspension mechanism which includes first and second pairs of link arms arranged on opposite sides of the seat with each of the first and second pairs having a controller arm and a follower arm which are pivotally joined at a portion therealong. A first end of the controller arms of the first and second pairs of link arms is fixedly mounted for pivotally movement to the front portion of the base and a second end is fixedly and pivotally mounted to the rear portion of the bottom surface of the seat.

A first end of the follower arms of the first and second pair of link arms is operatively associated with the front portion of the bottom surface of the seat and a second end is operatively associated with the rear portion of the base. Next, positioning spring means between the base and the seat to provide biasing support therebetween. Then, exerting an initial force on the seat by the weight of the operator for moving the seat to a first position along a predetermined path of motion defined by the relative movement of the controller and follower arms of the first and second link arms to establish a predetermined distance between the seat and the foot-operated control pedal. Finally, exerting a plurality of forces on the seat which varies throughout the operation of the work machine for automatically moving the seat to a plurality of respective positions along the predetermined path of motion with the relative movement of the controller arms being in an arcuate path and the relative movement of the follower arms being responsive to the arcuate path of the controller arms for maintaining the predetermined distance between the seat and the foot-operated control pedal throughout the plurality of positions along the predetermined path of motion.

The present invention includes a seat suspension mechanism with first and second pairs of link arms arranged on opposite side of a seat. The link arms are mounted to a seat and a base in a manner which allows the first pair of link arms to move under forces encountered during operation of the work machine in an arcuate path and the second pair of link arms to move in a path responsive to the arcuate path. The movement of the first and second link arms moves the seat within a predetermined path of motion in which the distance between the seat and any foot-controlled pedals is maintained therethrough. The ability to maintain this substantially constant distance between the seat and any foot-controlled pedals throughout operation of the machine provides for improved operator comfort and control.

EST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
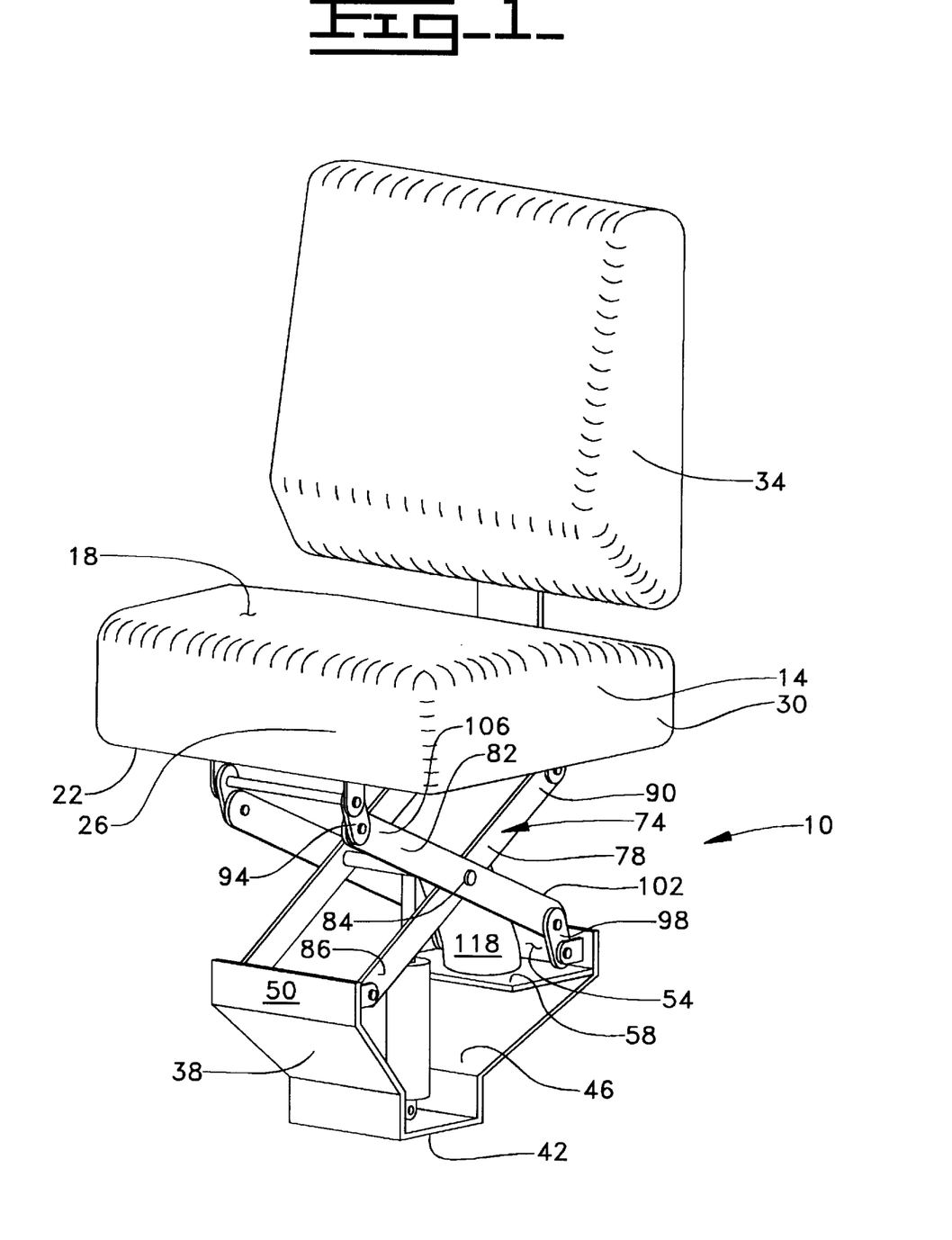
FIG. 1 is a perspective view of a seat with a suspension system of the present invention.
Figure 2:
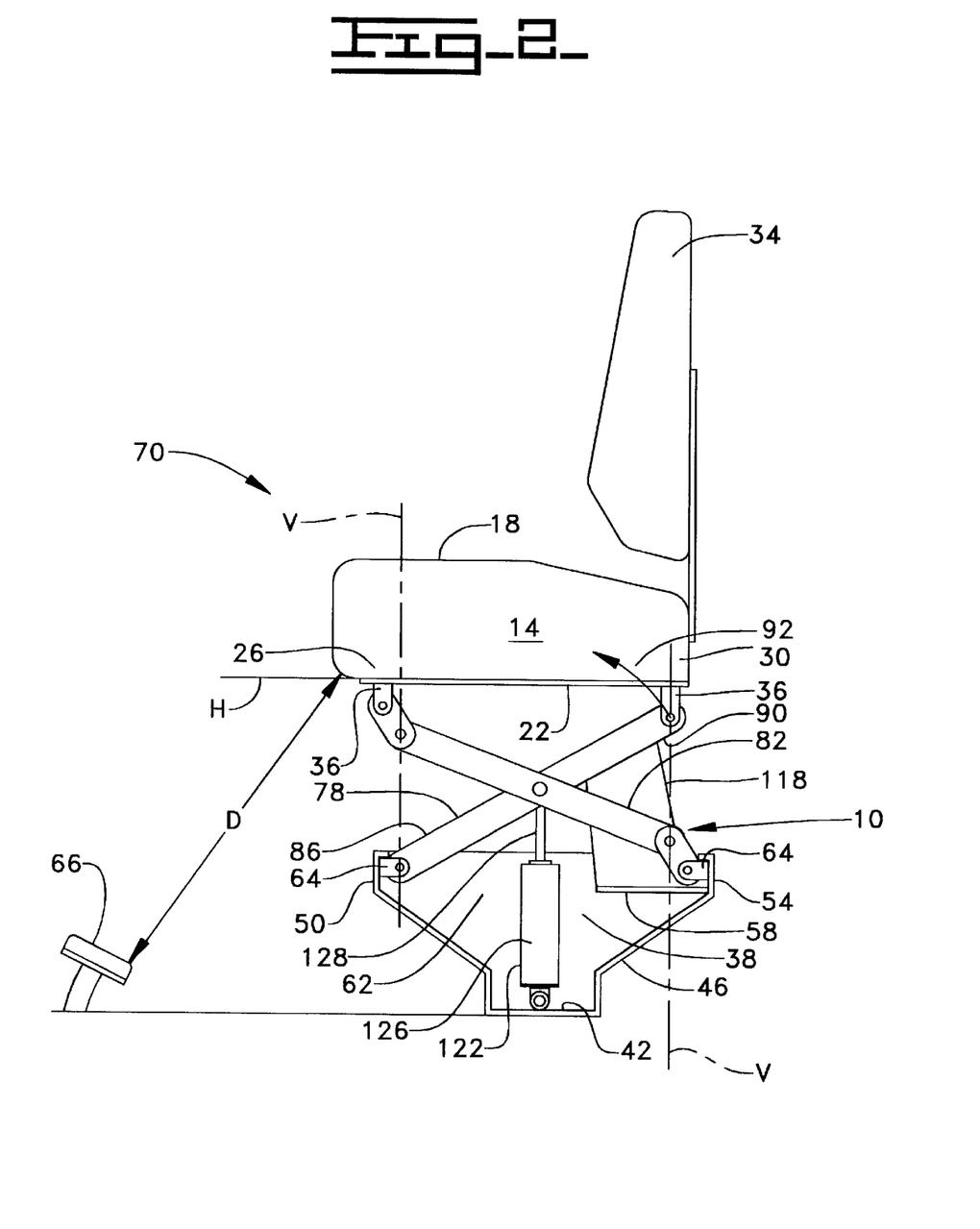
FIG. 2 is a side view of the seat with the suspension system raised to an upper position.
Figure 3:
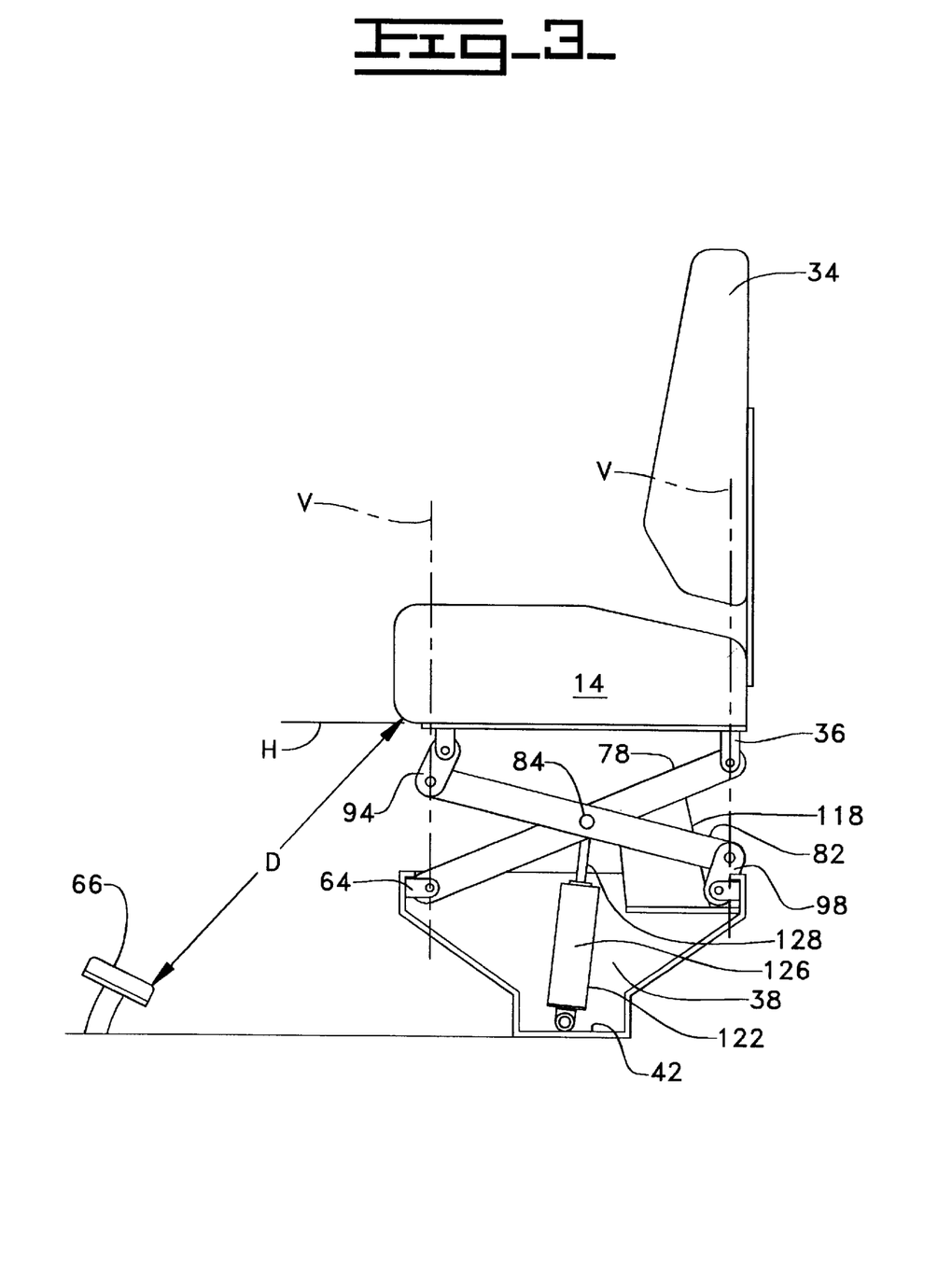
FIG. 3 is a side view of the seat with the suspension system lowered to a lower position.

Referring to FIGS. 1–3, a seat suspension system 10 is shown supporting a seat 14 of any suitable design, which includes top and bottom surfaces 18,22, front and rear portions 26,30 and a back support 34. The front and rear portions 26,30 each have a pair of fixed tabs 36 extending downwardly from the bottom surface 22 at opposite sides of the seat 14. The suspension system 10 is connected to a work machine (not shown) through a supporting portion in the form of a baseplate 38. The baseplate 38 has a planar bottom wall portion 42 and an intermediate portion 46 which extends angularly upward and terminates at a pair of vertical side walls 50,54 representing front and rear portions of the baseplate 38, respectively. The rear portion 54 of the baseplate 38 includes a horizontal shelf 58 extending therefrom toward a midportion 62 of the baseplate 38. A pair of fixed tabs 64 extend inwardly toward the midportion 62 from opposed sides of each of the front and rear portions 50,54 of the baseplate 38 at a location above the horizontal shelf 58. A control pedal 66 of any suitable type is positioned a predetermined distance D from the seat 14 at a forward location therefrom, as seen in the drawings, and operated by a foot (not shown) of an operator (not shown) sitting therein within a compartment 70 of the work machine (not shown).

The seat suspension system 10 has a seat suspension mechanism 74 with two pairs of link arms including a controller arm 78 and a follower arm 82 for moving the seat 14 toward and away from the baseplate 38. The controller arm 78 and follower arm 82 cross each other at their respective midpoints 84 and are pivotally joined in a well-known manner. A first end 86 of the controller arm 78 is fixedly mounted for pivotal movement in a well-known manner through the pair of fixed tabs 64 extending from the front portion 50 of the baseplate 38. A second end 90 of the controller arm 78 is fixedly mounted for pivotal movement in a well-known manner through the pair of fixed tabs 36 extending from the rear portion 30 of the seat 14 at the bottom surface 22. The first and second ends 86,90 are substantially equidistant from the respective midpoint 84. The pivotal connection of the controller arm 78 to the seat 14 and baseplate 38 allow for movement along an arcuate path 92, shown by the arrows in FIG. 2, when forces are exerted on the seat 14, such as by an operator's weight or during operation of the work machine (not shown).

The follower arm 82 includes first and second pivot links 94,98 pivotally mounted in a well-known manner at respective first and second ends 102,106. The first and second ends 86,102,90,106 of the controller and follower arms 78,82 each respectively define a vertical plane V, shown in FIG. 2, which lies substantially equidistant from the midpoint 84 along a horizontal plane H, shown in FIG. 2, defined by the bottom surface 22 of the seat 14. The first pivot link 94 is fixedly mounted for pivotal movement in a well-known manner through the pair of fixed tabs 36 extending from the front portion 26 of the seat at the bottom surface 22. The second pivot link 98 is fixedly mounted for pivotal movement in a well-known manner through the pair of fixed tabs 64 extending from the rear portion 54 of the baseplate 38. The pivotal connection of the follower arm 82 to the seat 14 and baseplate 38 in cooperation with the pivotal movement of the pivot links 94,98 allow corrective movement in both a arcuate and linear path responsive to the arcuate path 92 of the controller arm 78 when forces are exerted thereon, as can be seen more clearly in the change of position between FIGS. 2 and 3. The relative movement of the controller and follower arms 78,82 moves the seat 14 along a defined path of motion.

An air spring 118 or any other suitable spring device is positioned between the seat 14 and the baseplate 38 to counteract the movement of the seat 14 toward the baseplate 38 and to provide a biasing action therebetween. The air spring 118 is disposed in a well-known manner on the horizontal shelf and extends upwardly for connection on a transverse structure (not shown) interconnecting the pair of controller arms 78. A shock absorber 122 of any suitable type has a cylinder housing 126 connected to the baseplate 38 in any well-known manner. A cylinder rod 128 extends upwardly from the midportion 62 of the baseplate 38 for connection at a cross-shaft (not shown) between the pair of controller arms 78 to dampen movement of the seat in a vertical direction.

Figure 4:
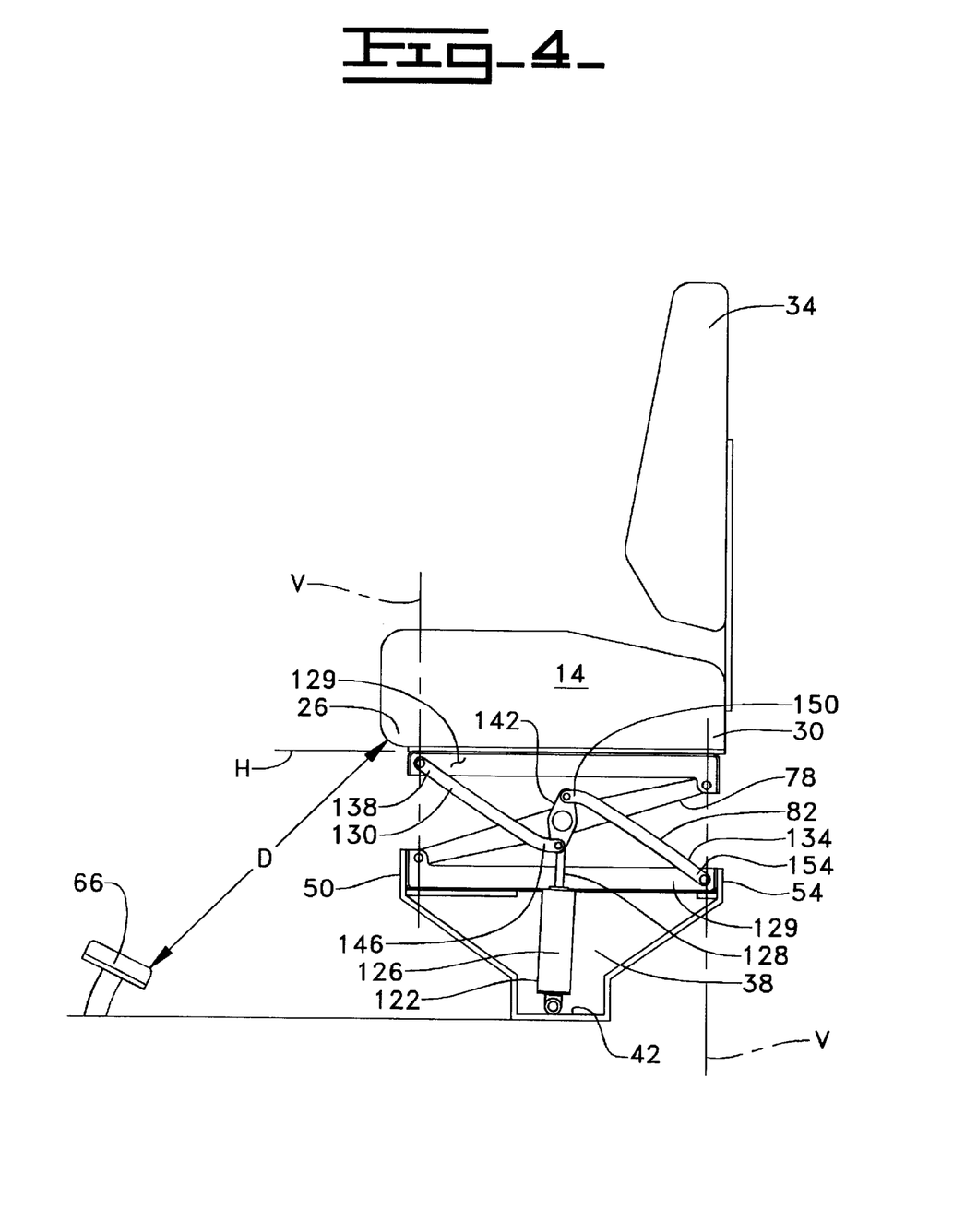
FIG. 4 is a side view of the seat with a second embodiment of the suspension system.

A second embodiment of the present invention is shown in FIG. 4. It should be understood that reference numbers shown in FIGS. 1–3 will be used to designate similar features of this embodiment. A pair of mounting structures 129 are attached in any suitable manner to the baseplate 38 and the bottom surface 22 of the seat 14 and extend between the fixed tabs 36. The follower arm 82 includes front and rear links 130,134. A first end 138 of the front link 130 is fixedly mounted for pivotal movement in the well-known manner through the mounting structure 129 in connection with pair of fixed tabs 36 extending from the front portion 26 of the seat at the bottom surface 22. An intermediate link 142 is pivotally mounted at a second end 146 of the front link 130 and a first end 150 of the rear link 134 and disposed therebetween. A second end 154 of the rear link 134 is fixedly mounted for pivotal movement in a well-known manner through the mounting structure 129 in connection with the pair of fixed tabs 64 extending from the rear portion 54 of the baseplate 38. The pivotal connection of the front and rear links 130,134 to the seat 14 and baseplate 38 in cooperation with the pivotal movement of the intermediate link 142 allow for corrective movement in both an arcuate and linear path responsive the arcuate path of the controller arm 78 when forces are exerted thereon. As in the first embodiment, the relative movement of the controller and follower arms 78,82 moves the seat 14 along a defined path of motion. The first and second ends 86,138,90,154 of the controller and follower arms 78,82 each respectively define a vertical plane V, shown in FIG. 4, which lies substantially equidistant from the midpoint 84 along a horizontal plane H, shown in FIG. 4, defined by the bottom surface 22 of the seat 14.

Figure 5:
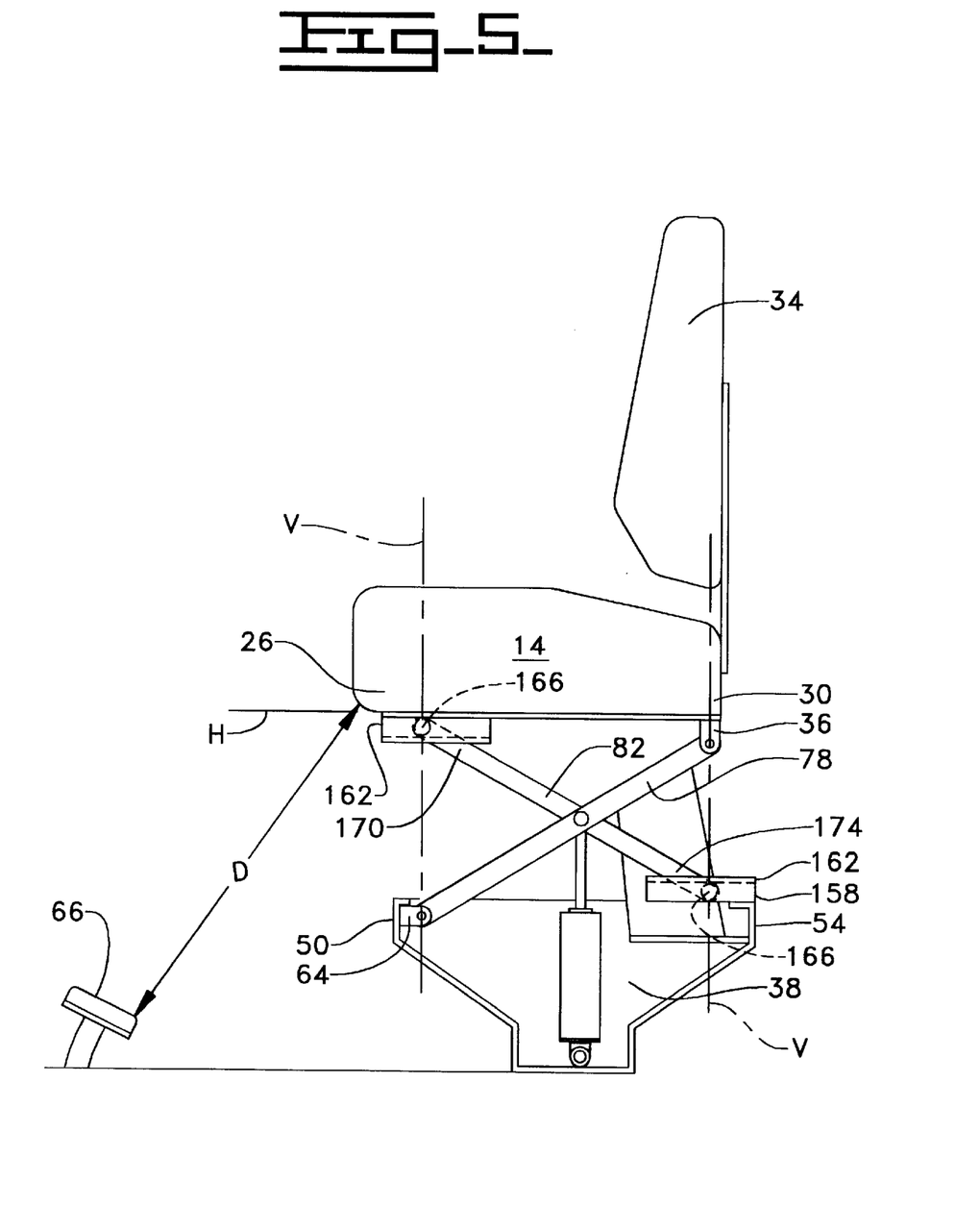
FIG. 5 is a side view of the seat with a third embodiment of the suspension system.

A third embodiment of the present invention is shown in FIG. 5. It should be understood that reference numbers shown in FIGS. 1–3 will be used to designate similar features of this embodiment. A conventional track system 162 is mounted on opposed sides of the front portion 22 of the seat 14 at the bottom surface 22 and on opposed sides of the rear portion 54 of the baseplate 38. The track system 162 extends rearwardly from the front portion 26 of the seat 14 and forwardly from the rear portion 54 of the baseplate 38 toward the midpoint 84 and substantially half-way therebetween. The follower arm 82 includes a roller 166 of any suitable type at respective first and second ends 170,174 which are slidingly disposed within the track system in a well-known manner. The pivotal connection of the follower arm 82 to the seat 14 and baseplate 38 and the action of the rollers 166 in cooperation with the track system 162 allow movement in a corrective horizontal path responsive to the arcuate path 92 of the controller arm 78 when forces are exerted thereon. As in the first embodiment, the relative movement of the controller and follower arms 78,82 moves the seat 14 along a defined path of motion. The first and second ends 86,170,90,174 of the controller and follower arms 78,82 each respectively define a vertical plane V, shown in FIG. 5, which lies substantially equidistant from the midpoint 84 along a horizontal plane H, shown in FIG. 5, defined by the bottom surface 22 of the seat 14.

Industrial Applicability

When a force is exerted on the seat 14 by the weight of the operator (not shown), it moves the seat 14 to a position along its path of motion defined by the relative arcuate movement of the controller arm 78 and the responsive movement of the follower arm 82. The distance between the seat 14 and the foot-operated control pedal 66 remains substantially constant throughout the movement of the seat 14 due to the corrective movement available in the follower arm 82 designs.

During operation and travel of the work machine (not shown), a plurality of various forces are exerted upon the seat 14. These forces move the seat 14 to a plurality of respective positions along its path of motion defined by the relative arcuate movement of the controller arm 78 and the responsive movement of the follower arm 82. The relative movement between the controller and follower arms 78,82 is designed to substantially maintain the distance between the seat 14 and the foot-operated control pedal 66 throughout all plurality of positions. The ability to maintain the distance provides greater control for the operator (not shown) on the foot-operated control pedal while providing added comfort in the seat 14. Additionally, the symmetrical design of the seat suspension system 10, as noted in the relationship between H and V, maintains the bottom surface 22 of the seat 14 substantially parallel with the baseplate 38 throughout its path of motion thereby holding a horizontal attitude therewith.

Other aspects, objects and advantages of this invention can be obtained from a study of the drawings, disclosure and the appended claims.

We claim:

1. A seat suspension system adapted for supporting an operator within a compartment of a work machine, the compartment having at least one control pedal mounted therein operable by a foot of the operator, comprising:

a base;

a seat having an upper surface in which an operator is positioned and a bottom surface, the seat being movable toward and away from the base;

spring means positioned between the base and the seat to provide biasing support therebetween; and a seat suspension mechanism operatively associated with the bottom surface of the seat and the base for automatically moving the seat along a predetermined path of motion when forces are exerted thereon to maintain a substantially constant distance between the seat and the foot-operated control pedal throughout the predetermined path of motion.

2. The seat suspension system of claim 1, wherein the seat suspension mechanism includes the base and the bottom surface of the seat having respective front and rear portions, first and second pairs of link arms arranged on opposite sides of the seat with each of the first and second pairs having a controller arm and a follower arm which are pivotally joined at a portion therealong, a first end of the controller arm of the first and second pairs of link arms being fixedly mounted for pivotal movement to the front portion of the base and a second end of the controller arm of the first and second pairs of link arms being fixedly mounted for pivotally movement to the rear portion of the bottom surface of the seat, and a first end of the follower arm of the first and second pairs of link arms being operatively associated with the front portion of the bottom surface of the seat and a second end of the follower arm of the first and second pairs of link arms being operatively associated with the rear portion of the base and responsive to the pivotal movement of the controller arm for providing movement of the seat along the predetermined path of motion.

3. The seat suspension system of claim 2, wherein the follower arm of the first and second pairs of link arms includes a pair of pivot links pivotally mounted at respective first and second ends thereof, the pair of pivot links being fixedly mounted for pivotally movement to the respective front portion of the bottom surface of the seat and the rear portion of the base.

4. The seat suspension system of claim 2, wherein the follower arm of the first and second pairs of link arms includes front and rear links fixedly mounted for pivotally movement to the respective front portion of the bottom surface of the seat and the rear portion of the base and an intermediate link pivotally mounted therebetween.

5. The seat suspension system of claim 2, wherein a track is provided a predetermined distance along the front portion of the bottom surface of the seat and the rear portion of the base to cover at least half of the bottom surface of the seat and the follower arm of the first and second pairs of link arms includes a roller at each of the first and second ends thereof which is slidingly disposed within the respective track.

6. A seat suspension system adapted for supporting an operator within a compartment of a work machine, the compartment having at least one control pedal mounted therein operated by a foot of the operator, comprising:

a base having front and rear portions;

a seat having a top surface and a bottom surface with front and rear portions, the seat being movable toward and away from the base;

spring means positioned between the base and the seat to provide biasing support therebetween; and a seat suspension mechanism including first and second pairs of link arms arranged on opposite sides of the seat with each of the first and second pairs having a controller arm and a follower arm which are pivotally joined at a portion therealong, a first end of the controller arms of the first and second pairs of link arms fixedly mounted for pivotally movement to the front portion of the base and a second end fixedly mounted for pivotally movement to the rear portion of the bottom surface of the seat and adapted for movement along a first predetermined arcuate path in response to a plurality of forces exerted thereon and a first end of the follower arms of the first and second pair of link arms operatively associated with the front portion of the bottom surface of the seat and a second end operatively associated with the rear portion of the base and adapted for movement along a second predetermined path responsive to the first arcuate predetermined path for substantially maintaining a constant distance between the seat and the foot-operated control pedal throughout the first and second predetermined paths of movement of the controller and follower arms while maintaining a horizontal attitude of the seat in relation to the base.

7. A seat suspension system, comprising:

a base having front and rear portions;

a seat having a top surface and a bottom surface with front and rear portions, the seat being movable toward and away from the base;

spring means positioned between the base and the seat to provide biasing support therebetween; and a seat suspension mechanism including first and second pairs of link arms arranged on opposite sides of the seat with each of the first and second pairs having a controller arm and a follower arm which are pivotally joined at a substantial midpoint, a first end of the controller arms of the first and second pairs of link arms fixedly mounted for pivotal movement to the front portion of the base and a second end fixedly mounted for pivotal movement to the rear portion of the bottom surface of the seat, a first end of the follower arms of the first and second pair of link arms operatively associated with the front portion of the bottom surface of the seat and a second end operatively associated with the rear portion of the base with each of the follower arms including front and rear links pivotally mounted to the respective front portion of the bottom surface of the seat and the rear portion of the base and an intermediate link pivotally mounted therebetween, and the respective first and second end of the controller and follower arms being positioned a substantially equal distance from the midpoint along a horizontal plane defined by the bottom surface of the seat.

8. The seat suspension system of claim 7, wherein the follower arm of the first and second pairs of link arms includes front and rear links pivotally mounted to the respective front portion of the bottom surface of the seat and the rear portion of the base and an intermediate link pivotally mounted therebetween.

9. The seat suspension system of claim 7, wherein a track is provided a predetermined distance along the front portion of the bottom surface of the seat and the rear portion of the base to cover at least half of the bottom surface and the follower arm of the first and second pairs of link arms includes a roller at each of the first and second ends thereof which is slidingly disposed within the respective track.

10. Method of maintaining a substantially constant distance between a seat and a control pedal operated by a foot of an operator within a work machine, the method comprising the steps of:

connecting a base having front and rear portion to the work machine;

connecting the base and the seat through a seat suspension mechanism which includes first and second pairs of link arms arranged on opposite sides of the seat with each of the first and second pairs having a controller arm and a follower arm which are pivotally joined at a portion therealong, a first end of the controller arms of the first and second pairs of link arms fixedly mounted for pivotally movement to the front portion of the base and a second end fixedly mounted for pivotally movement to the rear portion of the bottom surface of the seat and a first end of the follower arms of the first and second pair of link arms operatively associated with the front portion of the bottom surface of the seat and a second end operatively associated with the rear portion of the base;

positioning spring means between the base and the seat to provide biasing support therebetween;

exerting an initial force on the seat by the weight of the operator for moving the seat to a first position along a predetermined path of motion defined by the relative movement of the controller and follower arms of the first and second link arms to establish a predetermined distance between the seat and the foot-operated control pedal; and exerting a plurality of forces on the seat which varies throughout the operation of the work machine for automatically moving the seat to a plurality of respective positions along the predetermined path of motion, the relative movement of the controller arms being in an arcuate path and the relative movement of the follower arms being responsive to the arcuate path of the controller arms for maintaining the predetermined distance between the seat and the foot-operated control pedal throughout the plurality of positions along the predetermined path of motion.

11. The method for maintaining a substantially constant distance between a seat and a control pedal of claim 10, including the steps of:

simultaneously maintaining the horizontal attitude of the seat in relation to the base throughout the plurality of positions along the predetermined path of motion.

* * * * *